(12) United States Patent
Sharkey

(10) Patent No.: US 9,288,254 B2
(45) Date of Patent: *Mar. 15, 2016

(54) DYNAMIC PLAYLIST FOR MOBILE COMPUTING DEVICE

(71) Applicant: Google Inc., Mountain View, CA (US)

(72) Inventor: Jeffrey A. Sharkey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/033,602

(22) Filed: Sep. 23, 2013

(65) Prior Publication Data

US 2014/0019596 A1  Jan. 16, 2014

Related U.S. Application Data

(63) Continuation of application No. 13/103,647, filed on May 9, 2011, now Pat. No. 8,661,151.

(51) Int. Cl.
| | |
|---|---|
| *G06F 15/16* | (2006.01) |
| *G06F 3/00* | (2006.01) |
| *G06F 13/00* | (2006.01) |
| *H04N 5/445* | (2011.01) |
| *H04L 29/08* | (2006.01) |

(Continued)

(52) U.S. Cl.
CPC .......... *H04L 67/02* (2013.01); *G06F 17/30017* (2013.01); *G06F 17/30053* (2013.01); *H04L 67/18* (2013.01); *H04L 67/306* (2013.01); *H04M 1/7253* (2013.01); *H04M 1/72558* (2013.01); *H04M 1/72572* (2013.01); *H04N 21/26258* (2013.01); *H04N 21/41407* (2013.01); *H04N 21/458* (2013.01); *H04N 21/4524* (2013.01); *H04N 21/4532* (2013.01); *H04N 21/4788* (2013.01); *H04W 4/023* (2013.01)

(58) Field of Classification Search
CPC ..................... H04N 21/26258; G06F 17/30017
USPC ...................................... 709/201–205; 725/46
See application file for complete search history.

(56) References Cited

U.S. PATENT DOCUMENTS

| | | |
|---|---|---|
| 7,302,468 B2 | 11/2007 | Wijeratne |
| 7,376,901 B2 | 5/2008 | Shen et al. |

(Continued)

OTHER PUBLICATIONS

Thiel et al., Sound based Proximity Detection with Mobile Phones, Nov. 6, 2012.*

(Continued)

*Primary Examiner* — Shirley Zhang
(74) *Attorney, Agent, or Firm* — Fish & Richardson P.C.

(57) ABSTRACT

A method of managing electronic media items includes accessing first geographic information that indicates a first geographic location of a first device; accessing second geographic information that indicates a second geographic location of a second device; determining whether the first device and the second device are within a defined geographic proximity based on the first geographic location and the second geographic location; if the determination indicates that the first device and the second device are within the defined geographic proximity, generating at least one playlist of media items based on a set of media preferences shared between a first user of the first device and a second user of the second device; and sending the playlist to the first device such that the first user is able to select one or more of the media items on the playlist to be output by the first device.

17 Claims, 5 Drawing Sheets

(51) Int. Cl.
| | |
|---|---|
| G06F 17/30 | (2006.01) |
| H04N 21/262 | (2011.01) |
| H04N 21/414 | (2011.01) |
| H04N 21/45 | (2011.01) |
| H04N 21/458 | (2011.01) |
| H04N 21/4788 | (2011.01) |
| H04W 4/02 | (2009.01) |
| H04M 1/725 | (2006.01) |

(56) References Cited

U.S. PATENT DOCUMENTS

| | | | |
|---|---|---|---|
| 7,886,072 | B2* | 2/2011 | Wormington et al. ........ 709/231 |
| 2003/0200290 | A1 | 10/2003 | Zimmerman et al. |
| 2003/0236582 | A1 | 12/2003 | Zamir et al. |
| 2004/0117378 | A1 | 6/2004 | Manandhar |
| 2004/0248601 | A1* | 12/2004 | Chang ........................... 455/500 |
| 2005/0021470 | A1 | 1/2005 | Martin et al. |
| 2005/0286546 | A1 | 12/2005 | Bassoli et al. |
| 2006/0242106 | A1* | 10/2006 | Bank ................................. 707/1 |
| 2007/0156676 | A1* | 7/2007 | Rosenberg ......................... 707/5 |
| 2007/0244880 | A1* | 10/2007 | Martin et al. ..................... 707/5 |
| 2007/0299737 | A1* | 12/2007 | Plastina et al. .................. 705/26 |
| 2008/0060043 | A1* | 3/2008 | Malik ............................ 725/134 |
| 2008/0222235 | A1 | 9/2008 | Hurst et al. |
| 2009/0158382 | A1 | 6/2009 | Shaffer et al. |
| 2009/0222392 | A1* | 9/2009 | Martin et al. .................... 706/46 |
| 2010/0094935 | A1* | 4/2010 | Svendsen et al. ............. 709/204 |
| 2011/0181496 | A1 | 7/2011 | Lanier et al. |
| 2011/0295843 | A1 | 12/2011 | Ingrassia et al. |
| 2012/0290943 | A1 | 11/2012 | Toney et al. |
| 2013/0268593 | A1 | 10/2013 | Parekh |
| 2014/0031961 | A1 | 1/2014 | Wansley et al. |

OTHER PUBLICATIONS

2011Push!Music [about project].pdf, Push!Music About Page, http://www.sics.se/fal/projects/music/project.html, accessed on Sep. 30, 2011.
About MP3tunes, MP3tunes, http://www.mp3tunes.com/cb/about, Feb. 7, 2010, accessed from http://web.archive.org/web/20100207180835/http://www.mp3tunes.com/cb/about/.
AudioBox, http://audiobox.fm/blog/new-version-of-audioboxfm-android-native-app-java-libraries-iphone, AudioBlog, Jul. 10, 2010.
Bassoli, Arianna et al. Social research for WAND and new media adoption on a local scale, dyd02: 2nd International Conference on Open Collaborative Design for Sustainable Innovation, Bangalore, Dec. 1-2, 2002.
Bassoli, Arianna et al., tunA: a handheld ad-hoc radio device for local music sharing, Human Connectedness, Projects, tunA, http://web.archive.org/web/20100710032924/http://web.media.mit.edu/~stefan/hc/projects/tuna, accessed on Sep. 30, 2011.
Bassoli, Arianna et al., TunA: a mobile music experience to foster local interactions, Adjunct Proceedings, UbiComp 2003 Fifth International Conference on Ubiquitous Computing, Seattle, Oct. 12-15, 2003.
Bassoli, Arianna et al., tunA: Local Music Sharing with Handheld Wi-Fi Devices, Fifth Wireless World Conference, University of Surrey, UK, Jul. 15-16, 2004.
Bassoli, Arianna et al., tunA: Synchronised Music-Sharing on Handheld Devices, Human Connectedness Group, Media Lab Europe, Sugar House Lane, Bellevue, Dublin 8, Ireland.
Battle of the Streaming Music Services, Lifehacker Showdown, Sep. 30, 2011.
Baumann, Stephan et al., BluetunA: Let Your Neighbour Know What Music You Like, CHI 2007, Interactivity, Apr. 28-May 3, 2007, San Jose, CA, ACM 978-1-59593-642-4/07/0004.
Carphone Warehouse and Catch Media launch cloud music service, The Music Ally Weblog—Sandbox FM—Digital Music Marketing Blog—Aliado Digital, http://musically.com/blog/2010/08/02/carphone-warehouse-and-catch-media-launch-cloud-music-service/, Aug. 2, 2010.
Hachman, Mark, MSpot Launches Mobile Music Streaming for Android, posted on AppScout, Jun. 28, 2010.
Hakansson, Maria et al., Designing a Mobile Music Sharing System Based on Emergent Properties. In Proceedings of AMT 2005, Third International Conference on Active Media Technology, May 19-21, 2005, Takamatsu, Japan.
Hakansson, Maria et al., Facilitating Mobile Music Sharing and Social Interaction with Push!Music, HICSS '07 Proceedings of the 40th Annual Hawaii International Conference on System Sciences, 2007.
International Search report issued in PCT/US2012/035128 on May 15, 2012, 4 pages.
Jacobsson, Mattias et al. Push!Music: Intelligent Music Sharing on Mobile Devices. In Adjunct Proceedings of UbiComp 2005, Sep. 11-14, 2005, Tokyo, Japan. Demonstration.
Kincaid, Jason, First Look:Lala's iPhone App Will Stream Your Music Library From the Cloud, Mar. 28, 2009.
Learn more about Spotify Mobile, http://www.spotify.com/int/mobile/learn-more, Aug. 20, 2010, accessed from http://web.archive.org/web/20100820054452/http://www.spotify.com/int/mobile/learn-more/.
O'Hara, Kenton et al., Consuming Music Together, Social and Collaborative Aspects of Music Consumption Technologies, Computer Science, Computer Supported Cooperative Work, vol. 35, http://www.springer.com/computer/book/978-1-4020-4031-3, accessed Oct. 12, 2011.
Parr, Ben, moof:A Free iTunes for the Web?, Jul. 19, 2009.
Push!Music [texts&presentations].pdf, Push!Music Text and Presentations Page, http://www.sics.se/fal/projects/music/texts.html, accessed on Sep. 30, 2011.
Push!Music[home].pdf, Push!Music About Page, http://www.sics.se/fal/projects/music/index.html, accessed on Sep. 30, 2011.
Rhapsody + Electronics, http://www.rhapsody.com/iphone, Aug. 24, 2010, accessed from http://web.archive.org/web/20100824001310/http://www.rhapsody.com/iphone, Au.
There's No App for That, http://blog.psonar.com/2010/03/19/theres-no-app-for-that-2/, Mar. 19, 2010.
Vanhemert, Kyle, MOG Mobile for iPhone and Android Streams 8 Million Songs and Lets You Download 'Em All, , Jul. 20, 2010.
Written Opinion of the International Searching Authority issued in PCT/US2012/025128 on May 15, 2012, 9 pages.
Office Action issued in U.S. Appl. No. 13/249,784 on Nov. 9, 2011, 21 pages.
Office Action issued in U.S. Appl. No. 13/249,784 on Apr. 3, 2012, 51 pages.
Office Action issued in U.S. Appl. No. 13/103,647 on Jun. 17, 2013, 25 pages.
Notice of Allowance issued in U.S. Appl. No. 13/249,784 on Sep. 10, 2012, 14 pages.
Notice of Allowance issued in U.S. Appl. No. 13/103,647 on Oct. 16, 2013, 7 pages.
International Preliminary Report on Patentability issued in PCT/US2012/025128 on Nov. 21, 2013, 11 pages.

* cited by examiner

DYNAMIC PLAYLIST FOR MOBILE COMPUTING DEVICE

CROSS-REFERENCE TO RELATED APPLICATION

This application is a continuation of U.S. application Ser. No. 13/103,647, filed May 9, 2011, the contents of which is incorporated by reference.

TECHNICAL FIELD

This document generally relates to generating a dynamic playlist for a mobile computing device.

BACKGROUND

Mobile computing devices, such as mobile telephones, or smartphones, may include media players that allow users of the devices to play media such as audio books, music, and video. The media may be stored locally on a mobile computing device. Also, the media may be stored remote from the mobile computing device. For example, a user of a mobile device may request that a server system stream media to the mobile computing device.

SUMMARY

This document discusses systems and techniques by which different users of computing devices may share media information when the users (and their respective devices) are determined to be proximate to one another. For example, location reporting structures on two devices, such as GPS modules, may monitor the locations of devices and report those locations to a central service, which may make a determination that two devices are near each other when their reported GPS coordinates are proximate to each other. Alternatively, two devices may be determined to be proximate to each other based on near field communication (NFC) or similar structures on the device, where one device may read an identifier from the other device when it is brought near the other device. The one device may then access a playlist for the other device, such as through a cloud-based media (e.g., music and/or video) service, and may begin playing media that corresponds to an account of a user of the other device. In one example, when multiple users are determine to be near each other (e.g., in the same house or room), a playing media device may be caused to access a playlist (e.g., from a hosted internet-based music service) that is dynamically generated by identifying preferences of each of the users (e.g., by analyzing their existing media libraries and/or playlists) and generating a common playlist that is determined to be most favorably received by the group of users. In another example, a user may visit a friend's house, move her smartphone proximate to the friend's home stereo component, and have the home stereo begin streaming the first user's playlists.

In pone implementation, a method of managing electronic media items is disclosed. The method comprises accessing first geographic information that indicates a first geographic location of a first device; accessing second geographic information that indicates a second geographic location of a second device; determining whether the first device and the second device are within a defined geographic proximity based on the first geographic location and the second geographic location; if the determination indicates that the first device and the second device are within the defined geographic proximity, generating at least one playlist of media items based on a set of media preferences shared between a first user of the first device and a second user of the second device; and sending the playlist to the first device such that the first user is able to select one or more of the media items on the playlist to be output by the first device. The method can also include accessing a first set of historical usage data for media items in a first media library associated with the first user; accessing a second set of historical usage data for media items in a second media library associated with the second user; and determining the set of media preferences shared between the first user and the second user based on the first set of historical usage data and the second set of historical usage data.

In some instances, determining the set of media preferences shared between the first user and the second user based on the first set of historical usage data and the second set of historical usage data comprises determining a first set of personal media preferences for the first user based on the first set of historical data; determining a second set of personal media preferences for the second user based on the second set of historical data; and determining media preferences shared between the first set of personal media preferences and the second set of personal media preferences. Also, generating the at least one playlist can comprise accessing metadata for multiple media items in a media library associated with the first user; for each of the multiple media items, determining a mutual interest score based on the accessed metadata and the set of media preferences shared between the first user and the second user; selecting media items from the multiple media items that have a mutual interest score over a defined threshold; and including the selected media items on the playlist. The metadata can indicate characteristics of content included in the multiple media items.

In other instances, the method also includes accessing a first set of historical usage data for media items in a first media library associated with the first user; determining a first set of personal media preferences for the first user based on the first set of historical data; accessing a second set of historical usage data for media items in a second media library associated with the second user; determining a second set of personal media preferences for the second user based on the second set of historical data; determining the set of media preferences shared between the first user and the second user by determining an overlap of the media preferences between the first set of personal media preferences and the second set of personal media preferences; accessing metadata for multiple media items in a media library associated with the first user; for each of the multiple media items, determining a mutual interest score based on the accessed metadata and the set of media preferences shared between the first user and the second user; selecting media items from the multiple media items that have a mutual interest score that exceeds a defined threshold; and including the selected media items on the playlist.

In yet other instances, generating the at least one playlist includes generating a first playlist based on the set of media preferences and a first media library associated with the first device, the first playlist including media items included in the first media library and not including media items not included in the first media library; and generating a second playlist based on the set of media preferences and a second media library associated with the second device, the second playlist including media items included in the second media library and not including media items not included in the second media library. In such an instance, sending the playlist to the first device can includes sending the first playlist to the first device such that the first user is able to select one or more of the media items on the first playlist to be output by the first device; and sending the second playlist to the second device such that the second user is able to select one or more of the media items on the second playlist to be output by the second device. Moreover, the set of media preferences can include one or more indications of media items included in both a first media library associated with the first device and a second media library associated with the second device. The set of media preferences can alternatively include characteristics of content included in media items that have been selected by the first user for output by the first device and media items that have been selected by the second user for output by the second device.

In other aspects, the method further comprises receiving the first geographic location in response to the first user manually reporting the first geographic location using an application on the first device. The method can moreover comprise receiving the first geographic location in response to a location determination unit on the first device determining the first geographic location. Also, the location determination unit can be a Global Positioning System unit, and the first geographic location can be received from an application on the first device that is configured to automatically access the first geographic location determined by the location determination unit.

In another implementation, a system for managing electronic media items is disclosed. The system comprises a server system interface arranged to receive information that indicates geographic locations of devices for managing or playing electronic media files; a proximity detector implemented on the server system and programmed to identify when two or more devices associated with electronic media items are geographically proximate to each other; a mutual interest determiner on the server system arranged to determine media items in which users of the two or more devices are likely to be interested based on prior media-related selections by the users; and a playlist generator on the server system arranged to provide to one of the devices, media items determined by the media interest determiner to be of likely interested to the users. The system can also include a broadcast interface programmed to identify a destination identifier of one of the two or more devices, and to provide the media items provided by the playlist generator to the one device. The proximity detector can be programmed to compare longitude, latitude information received from each of the two or more devices in order to identify when the two or more devices are geographically proximate to each other.

In some aspects, the mutual interest determiner receives output form a media preference determiner that is programmed to (a) access a first set of historical usage data for media items in a first media library associated with a first user; and (b) access a second set of historical usage data for media items in a second media library associated with a second user. Also, the mutual interest determiner can be programmed to determine a set of media preferences shared between the first user and the second user based on the first set of historical usage data and the second set of historical usage data. Moreover, the playlist generator and mutual interest determiner can be programmed to provide the media items by (a) accessing metadata for multiple media items in a media library associated with the first user; (b) for each of the multiple media items, determining a mutual interest score based on the accessed metadata and the set of media preferences shared between the first user and the second user; (c) selecting media items from the multiple media items that have a mutual interest score over a defined threshold; and (d) including the selected media items on the playlist. In yet other aspect, the proximity detector can be programmed to determine relative proximity of devices based on venue names received from the two or more devices in response to users of the two or more devices manually checking in at venues that correspond to the venue names.

In yet another implementation, a method of managing electronic media items is disclosed. The method comprises reporting, from a portable computing device to a server system, information that identifies a location of the portable computing device and a request to receive a dynamic playlist that includes information for users in the proximity of the portable computing device; and receiving in response to the reporting information for playing a playlist of media items, wherein the playlist of media items is generated using a set of media preferences shared between a user of the portable computing device and the users in the proximity of the portable computing device. The method can also include receiving input from the user of the portable computing device with respect to the playlist of media items and causing the media items to be played in the proximity of the portable computing device in response to the received input. Causing the media items to be played can also comprise causing the media items to be played on the portable computing device, or on a third-party amplified music system, including by causing the server system to stream the media items to the third-party amplified music system without passing through the portable computing device. Finally, reporting information that identifies a location of the portable computing device can be performed in response to receiving a manual user check in that identifies a venue at which the user is located.

Each of the methods and processes discussed above may also be implemented as operations that are performed from the execution of instructions that are stored on one or more tangible computer-readable storage media, by being executed on one or more microprocessors.

Particular embodiments can be implemented, in certain instances, to realize one or more of the following advantages. For example, a playlist that would be enjoyable to multiple attendees of a social gathering may be generated. Also, a generated playlist may increase the enjoyment of people who attend a social gathering even in a situation in which everyone present does not enjoy all of the media content that is included in a particular user's media library.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

It can be difficult, in a group setting, to play media that multiple people enjoy. For example, a mobile computing device can be placed in a dock and media (e.g., music) can be played from one or more playlists that are stored on or otherwise associated with the mobile computing device. However, a number of people may not prefer the played content. Thus, in some implementations, if it is determined that multiple mobile computing devices are within a defined geographic proximity (e.g., several people with mobile computing devices may be gathered at a party or other location), one or more playlists of media items can be generated based on a set of media preferences shared between the users of the multiple mobile computing devices. The one or more playlists can be sent to one or more of the mobile computing devices, enabling a user of a mobile computing device to output the media items on a mobile computing device. The one or more playlists may also be played through a fixed media player, such as a home stereo receiver. For example, a user may place a mobile computing device into a dock and may play songs from a playlist, where the songs included in the playlist include attributes which are similar to media preferences shared by multiple users present at the location, and where the dock is attached to a stereo system.

Figure 1:
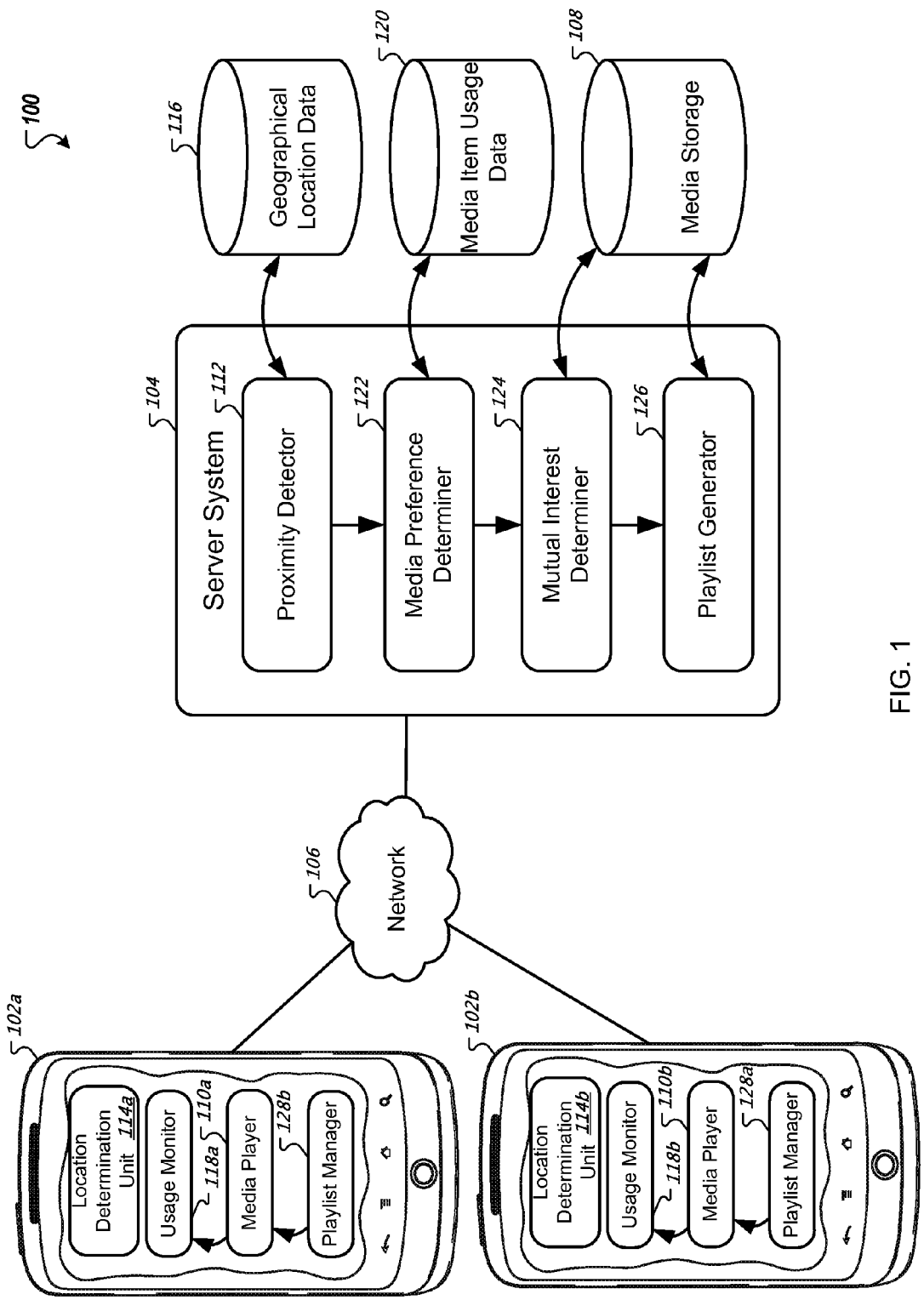
FIG. 1 illustrates an example of a system for generating one or more playlists.

FIG. 1 illustrates an example of a system 100 for generating one or more playlists. The system 100 includes mobile computing devices 102a and 102b. In general, a user of a mobile computing device 102a or 102b may use the mobile computing device 102a or 102b to navigate and browse a media library that is hosted by a server system 104 accessible over a network 106. The network 106 may include, for example, the Internet, and/or one or more other networks. The media library may be associated, for example, with the user of the mobile computing device 102a or 102b and/or with the mobile computing device 102a or 102b.

The media library that the user browses may, for example, reference hundreds or even thousands of media files. Accordingly, while the user may browse the media library using the mobile computing device 102a or 102b, the media files themselves may be stored remotely at the server system 104. Thus, in some implementations, metadata about some or all of the media files is stored locally on the mobile computing device 102a or 102b, with the corresponding media content stored at the server system 104. For example, media content that is included in a media library for a user of the mobile computing device 102a may be stored in a media storage 108 that is accessible from the server system 104. Similarly, the media storage 108 may include media content that is included in a media library associated with the mobile computing device 102b.

To browse an associated media library, the user may, for example, use a media player application 110a or 110b. The media player 110a or 110b may be an application program that is installed on the mobile computing device 102a or 102b, respectively, or a website that is accessed using the mobile computing device 102a or 102b. The media player 110a or 110b may enable the user of the mobile computing device 102a or 102b to browse a media library that is stored, for the user of the mobile computing device 102a or 102b, at the server system 104 in the media storage 108. The media player application 110a or 110b may allow the user to view various displays of media files in the user's media library. For instance, the user may choose to view only music media files (instead of video media files, audio book media files, and application program media files). When in the music media file "view," the user may elect to view the music files as sorted by artist, album, genre, song name, or playlist.

A playlist may be a user-defined or system-defined subset of the user's media library (which may be copies of media purchased by the user or a larger system library that is accessible to the user, such as via a subscription model. For example, a user may have created an "Exercising" playlist of music that includes songs that the user listens to when he exercises. Accordingly, when the user exercises, he may play (i.e., cause the mobile computing device to output the media, for example, either audibly and/or visually, as appropriate) a song in the playlist. When the playing song finishes, the media player may play a next song from the playlist, and may terminate playing songs when all of the songs in the playlist have been played.

In general, the user may provide user input that causes the media player 110a or 110b to play selected media. If the selected media file, or a portion thereof, is not already loaded to the mobile computing device 102a or 102b upon receiving the user input for causing the media file to play, the media player 110a or 110b may request that the server system 104 stream the selected media file to the mobile computing device 102a or 102b. For example, media content may be accessed from the media storage 108 and streamed over the network 106.

The mobile computing device 102a or the mobile computing device 102b can be placed into a dock, connected to speakers, connected to a video projector, or otherwise configured to broadcast media content. For example, music content can be output over speakers to be heard by people gathered in a room, on a patio, or at another location. One or more playlists of media items in the media libraries associated with mobile computing device 102a or 102b can be generated based on a set of media preferences that are shared between the users of the mobile computing devices 102a and 102b. More generally, such playlists may be generated based on the media preferences that are shared by the user of the mobile computing device 102a, the user of the mobile computing device 102b, and possibly one or more users of other mobile computing devices, such as mobile computing devices for which a user has opted into a service to generate playlists based on shared media preferences. The playlists can be generated, for example, and as described in more detail below, by a playlist generator 126 included in the server system 104. As another example, the computing device 102a and the computing device 102b can establish a peer-to-peer connection, and one or more playlists can be generated by the computing device 102a and/or the computing device 102b.

A generated playlist of media items can be sent to, for example, one or both of the mobile computing devices 102a and 102b, or to a separate device. The user of the mobile computing device 102a or 102b can select one or more of the media items on the generated playlist for output on the respective mobile computing device 102a or 102b. For example, one or more songs may be played while the mobile computing device 102a or 102b is placed in a dock.

Because the media items are selected for inclusion in the generated playlist based on matching shared media preferences, the probability is higher that all or multiple people present will enjoy a played media item than if a media item is selected from a media library without consideration of shared media preferences. This may help increase the enjoyment of the people present even in a situation in which everyone present does not enjoy all of the media content included in a particular user's media library.

The one or more playlists can be generated in response to a determination that both of the mobile computing devices 102a and 102b are within a defined geographic proximity of each other or of another device. For example, a proximity detector 112 included in the server system 104 may receive geographic information that indicates the geographic location of the mobile computing device 102a from a location determination unit 114a that is included in the mobile computing device 102a. Similarly, the proximity detector 112 may receive geographic information that indicates the geographic location of the mobile computing device 102b from a location determination unit 114b that is included in the mobile computing device 102b. The proximity detector 112 may determine that the distance between the geographic location of the mobile computing device 102a is less than a predetermined distance (e.g., one hundred feet) from the geographic location of the mobile computing device 102b and, in response, may generate playlists for one or both of the mobile computing devices 102a and 102b based on media preferences that are shared between the users of mobile computing device 102a and 102b.

The location determination units 114a and 114b may be, for example, GPS (Global Positioning System) units. Other examples include the location determination units 114a and 114b using cell-tower triangulation, near field communication (NFC), Bluetooth communication, or QR (Quick Response) code scanning by which one device may be visually exposed to another. As described in more detail below, location determination can include detection of inaudible (by humans) tones emitted by one or more devices.

As yet another example, a user of the mobile computing device 102a or 102b may manually report the location of the mobile computing device 102a or 102b using an application on the mobile computing device 102a or 102b. For example, the user may use the application to "check in" to an establishment or venue (e.g., coffee shop, library, restaurant), where the venue is associated with a geographic location. The application may allow the user to select a venue from a list of venues. For example, a list of candidate venues may be identified based on the geographic location of each candidate venue being near to the geographic location of the mobile device determined by the respective location determination unit 114a or 114b.

As a more particular example, a user may approach a strip mall that includes a coffee shop, a barber shop, and a restaurant. The user may enter the coffee shop, and may access an application on the mobile computing device 102a that allows the user to "check in" to an establishment. The application may access a geographic location of the mobile computing device 102a determined by the location determination unit 114a and may send the determined geographic location to the server system 104. The proximity detector component 112 (or another component) may identify establishments that are near the geographic location of the mobile computing device 102a based on geographic information of establishments accessed from geographic location data 116. The proximity detector 112 may send a list of candidate establishment identifiers (e.g., names of the coffee shop, the barber shop, and the restaurant) to the mobile computing device 102a. The application running on the mobile computing device 102a may present a list of candidate establishments, and in response, the user of the mobile computing device 102a may select the coffee shop. The application may send an indication of the coffee shop selection to the server system 104. The proximity detector 112 may store an indication of the user's checking in to the coffee shop in the geographic location data 116.

As another example of proximity determination, the proximity detector may determine whether the location of mobile computing device 102b is within a threshold distance of the establishment at which the mobile computing device is checked-in. For example, if the user of the mobile computing device 102b walks into the coffee shop, the location determination unit 114b may determine the geographic location of the mobile computing device 102b and the determined geographic location information may be sent to the server system 104 and stored in the geographic location data 116. The proximity detector 112 may determine that the mobile computing device 102b is within a defined geographic proximity of the mobile computing device 102a. For example, the proximity detector 112 may determine that the reported geographic location of the mobile computing device 102b is within a predetermined distance (e.g., one hundred feet) of the geographic location of the coffee shop establishment checked into by the user of the mobile computing device 102a. Thus, the proximity detector 112 may, for example, determine that two mobile computing devices are within a geographic proximity if one, both, or none of the users of the mobile computing devices checks in to an establishment.

As mentioned, one or more playlists of media items can be generated based on a set of shared media preferences. Media preferences can indicate preferred actors, preferred directors, preferred songs, preferred artists, preferred genres, or particular music styles such as "songs with rock structures, vocal harmony, and improvisation," to name a few examples. Media preferences for a user can be determined, for example, by a user explicitly stating one or more preferences such as preferred artists or genres. As another example, media preferences for a user may be determined by the media content included in the user's media library.

As yet another example, media preferences may be determined for a user based on historical usage data. For example, media preferences can be determined based on media items the user has played, and based on which media items the user has played most recently. Also, icons may be displayed during the playing of each media file, by which the user can indicate that they like or dislike the media file. A usage monitor 118a or 118b that is included in the mobile computing device 102a or 102b, respectively, can monitor media content played by the respective mobile computing device 102a or 102b. Data that indicates played media content can be sent to the server system 104 and can be stored in media item usage data 120.

A media preference determiner 122 can determine media preferences for the user of the mobile computing device 102a or 102b based on historical usage data accessed from the media item usage data 120 for media items in a media library associated with the user. For example, the media preference determiner 122 may determine a first set of personal media preferences for the user of the mobile computing device 102a and a second set of personal media preferences for the user of the mobile computing device 102b. The media preference determiner 122 may determine media preferences shared between the user of the mobile computing device 102a and the user of the mobile computing device 102b by determining an overlap of the personal media preferences between the first set of personal media preferences and the second set of personal media preferences.

To generate a playlist for the mobile computing device 102a or 102b, a mutual interest determiner 124 may access metadata for multiple media items in a media library associated with the user of the mobile computing device 102a or 102b. For example, the mutual interest determiner 124 may access metadata from the media storage 108. Metadata indicates characteristics of content that is included in a media item, such as a content title, artist, genre, or other content characteristics. For example, for music media, metadata can include gender of the lead vocalist, level of distortion of an electric guitar, type of background vocals, etc.

For each of the multiple media items in the media library, the mutual interest determiner 124 determines a mutual interest score based on the accessed metadata and the set of shared media preferences that are determined by the media preference determiner 122. For example, the mutual interest score may indicate how closely the metadata for a media item matches the shared media preferences. A mutual interest score may be determined, for example, using a vector distance function. In some implementations, a mutual interest score for a media item that has been recently played by the user of the mobile computing device 102a or by the user of the mobile computing device 102b may be reduced, to increase the likelihood of selecting media items that match the shared media preferences but that have not been recently played by either user.

The playlist generator 126 may select media items from the multiple media items in the media library that have a mutual interest score that exceeds a defined threshold (e.g., a threshold may be defined as a mutual interest score of eighty out of a possible score of one hundred). Selected media items may be included in a generated playlist, which may be populated with all media items that exceed the threshold score, or a top n media items (where n is a determined integer value). The generated playlist may be sent to the mobile computing device 102a or 102b. A playlist manager 128a or 128b included in the mobile computing device 102a or 102b, respectively, may access the received playlist and may select a media item for output on the mobile computing device 102a or 102b.

In some implementations, a first playlist may be generated and sent to the mobile computing device 102a, and a second playlist may be generated and sent to the mobile computing device 102b. For example, the first playlist may be generated based on the shared media preferences and on a media library associated with the mobile computing device 102a, such that each media item that is included in the first playlist is included in the media library associated with the mobile computing device 102a. Similarly, the second playlist may be generated based on the shared media preferences and on a media library associated with the mobile computing device 102b, such that each media item included in the second playlist is included in the media library associated with the mobile computing device 102b.

The first and second playlists may each include one or more common media items. As mentioned, media preferences may be based on media items included in a user's media library, played by a user, and/or played recently by a user. Therefore, if a media library associated with a first user and a media library associated with a second user each include common media items, these common media items may be included in a playlist that is sent to one or more mobile computing devices, since these media items may be representative of media preferences shared between the first user and the second user.

As another example, and as discussed above, one or more playlists may be sent to some other device (where the sending of a playlist may include sending metadata to the device that defines all or part of the playlist, or simply causing a server system to stream the media items in the playlist to the device). For example, the other device may be a media player device which includes speakers capable of outputting media items audible to multiple people occupying a physical space (e.g., a room, an elevator). For example, a playlist can be sent to a media player device included in an elevator, and the elevator media player device can play media items from the playlist over speakers, resulting in elevator music being played that is enjoyable by multiple users in the elevator. As another example, a playlist may be played using some other system that includes "shared" speakers and enables playback enjoyable by multiple users. As yet another example, a user may swipe his smartphone past a friend's boom box while visiting the friend's home, which may cause the smartphone to obtain an identifier for the boom box, or vice-versa, which identifier may be provided to a server system so that the user's playlist plays automatically through the boom box.

In some implementations, the device that includes shared speakers (e.g., the "shared speakers device") may emit a signal that is inaudible to humans but that is detectable by a microphone. For example, the mobile computing device 102a may include a microphone. If it is detected that the geographic location of the mobile computing device 102a is within a threshold distance (e.g., one hundred feet) of the geographic location of the shared speakers device, the mobile computing device 102a can begin to attempt to detect the signal from the shared speakers device. If the mobile computing device 102a is able to detect the signal from the shared speakers device, it may be determined that the user of the mobile computing device 102a is able to hear media items played on the shared speakers device. The mutual interest determiner 124 can generate or update shared media preferences based on media items associated with the mobile computing device 102a and can generate a new or updated playlist based on the shared media preferences.

As another example, suppose that the proximity detector 112 has detected that the mobile computing device 102a and the mobile computing device 102b are in proximity to one another. If the proximity detector 112 determines that another (e.g., a third) mobile computing device is nearby, the media preference determiner 122 can determine updated shared media preferences between the user of the mobile computing device 102a, the user of the mobile computing device 102b, and the user of the third mobile computing device. One or more updated playlists can be generated based on the updated shared media preferences. As another example, if the proximity detector 112 subsequently detects that one of the three mobile computing devices is no longer nearby, then updated shared media preferences can be determined between the two other mobile computing devices and one or more updated playlists can be generated based on the updated shared media preferences. In some implementations, it may be determined that a mobile computing device is no longer detecting a signal emitted from a shared speakers device, which may indicate that the user of the mobile computing device may no longer be in the area that includes the shared speakers device. Consequently, shared media preferences may be updated to account for the absence of the mobile computing device.

In some implementations, determining the updated shared media preferences may be based on how long a particular mobile computing device has been in proximity to other mobile computing devices or to some other device, such as a shared speakers device. For example, if the mobile computing device 102a and the mobile computing device 102b are in proximity to one another for thirty minutes and if the proximity detector 112 determines that a third mobile computing device is nearby, the media preference determiner 122 can determine updated shared media preferences between the three mobile computing devices, but may weight media preferences shared between the mobile computing device 102a and the mobile computing device 102b higher than media preferences shared between the third mobile computing device and the mobile computing device 102a and/or the mobile computing device 102b.

As another example, the media preference determiner 122 may determine updated shared media preferences to account for the most recently detected mobile computing device after a predetermined amount of time (e.g., ten minutes) has elapsed since the detection of the most recently detected mobile computing device. In other words, the shared media preferences can be updated if a mobile computing device has been nearby, for example, for ten minutes.

In some implementations, the playlist generator 126 generates a playlist of multiple media items, as described above. In other implementations, the playlist generator 126 does not generate a playlist of multiple media items, but rather identifies, in response to a request for a next media item, a next media item that matches the shared media preferences. The playlist generator 126 can receive a request for a next media item from, for example, the media player 110*a* or 110*b*, or from some other component or device. Identifying one media item at a time can result in not having to update a playlist of multiple media items in response to an update to the shared media preferences.

Figure 2:
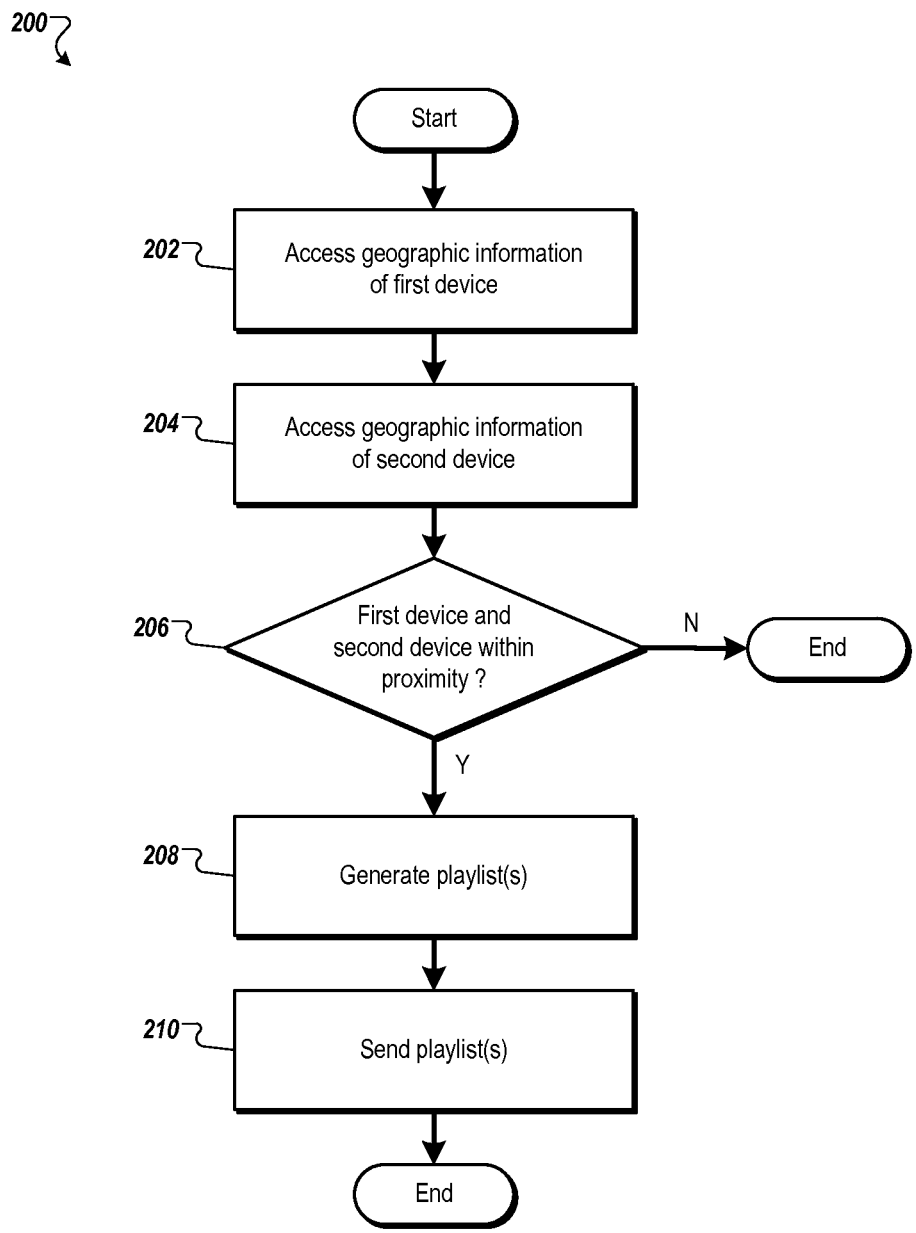
FIG. 2 is a flow chart showing an example of a process for generating one or more playlists.

FIG. 2 is a flow chart showing an example of a process 200 for generating one or more playlists. The process 200 can be performed by, for example, the server system 104, and for clarity of presentation, the description that follows uses the system 100 as the basis for describing the process 200. However, another system, or combination of systems, may be used to perform the process 200.

At box 202, the server system 104 accesses first geographic information that indicates a first geographic location of a first device. For example, the proximity detector 112 may receive geographic information that indicates the geographic location of the mobile computing device 102*a* as determined by the location determination unit 114*a*. The location determination unit 114*a* may be, for example, a GPS unit. The first geographic location may be received in response to the user of the first device manually reporting the first geographic location using an application on the first device. For example, the user of the first device may use the application to "check in" to an establishment to communicate to other users that the user is "at" the establishment. In some implementations, the first geographic location is received from an application on the first device that is configured to automatically access the first geographic location determined by the location determination unit.

The server system 104 accesses second geographic information that indicates a second geographic location of a second device (204). For example, the proximity detector 112 may receive geographic information that indicates the geographic location of the mobile computing device 102*b* as determined by the location determination unit 114*b*.

The server system 104 determines whether the first device and the second device are within a defined geographic proximity based on the first geographic location and the second geographic location (206). For example, the proximity detector 112 may determine whether the distance between the first geographic location and the second geographic location is less than a predefined distance (e.g., fifty feet). As another example, the proximity detector 112 may determine that both the user of the first device and the user of the second device have each "checked in" to a same establishment. As yet another example, the proximity detector 112 may determine that one of the user of the first device and the user of the second device has checked in to an establishment and that the other device is within a defined geographic proximity of the device used to check in to the establishment. In another example, one device may read an identification code form the other device, such as by reading a code from an NFC device. In yet another example, the devices may be shaken together, and accelerometers on the devices may use such shaking to generate a key by which communication between the devices may be performed, and by which one or more identifiers may be shared so that, in the manners, discussed above and below, media content associated with a user of one device may be shared with the other device.

In some implementations, the first device may be a device that includes speakers capable of being heard by multiple people who occupy a physical area (e.g., a room). The second device may be a mobile computing device that includes a microphone. The first device may emit a signal that is inaudible to humans but that is detectable by the mobile computing device. If it is detected that the geographic location of the mobile computing device is within a threshold distance (e.g., one hundred feet) of the geographic location of the first device, the mobile computing device can begin to attempt to detect the signal from the first device. If the mobile computing device is able to detect the signal from the first device, it may be determined that the mobile computing device is within a defined geographic proximity to the first device and it may be considered that the user of the mobile computing device is able to hear media items played on the first device. If other mobile computing devices are detected within range of the first device, it may be determined whether the other mobile computing devices are able to detect the signal from the first device.

If the server system 104 determines that the first device and the second device are not within the defined geographic proximity, the process 200 ends. If the server 104 determines that the first device and the second device are within the defined geographic proximity, the server system 104 generates at least one playlist of media items based on a set of media preferences that are shared between the first user of the first device and a second user of the second device (208). The set of shared media preferences may include one or more indications of media items that are included in both a first media library that is associated with the first device and a second media library that is associated with the second device. For example, the set of shared media preferences may include one or more indications of media items that are included in both a media library associated with the mobile computing device 102*a* and a media library associated with the mobile computing device 102*b*.

In some implementations, the shared media preferences may be based on historical usage data. For example, the set of shared media preferences may include characteristics of content included in media items that have been selected by the first user for output by the first device and media items that have been selected by the second user for output by the second device. For example, the set of shared media preferences may include characteristics of media items played by the mobile computing device 102*a* and played by the mobile computing device 102*b*.

In further detail, the media preference determiner 122 may access a first set of historical usage data (e.g., from the media item usage data 120) for media items in a first media library that is associated with the first user and may determine a first set of personal media preferences for the first user based on the first set of historical data. The media preference determiner 122 may also access a second set of historical usage data for media items in a second media library associated with the second user and may determine a second set of personal media preferences for the second user based on the second set of historical data. The media preference determiner 122 may determine the set of media preferences shared between the first user and the second user by determining an overlap of the media preferences between the first set of personal media preferences and the second set of personal media preferences.

Generating a playlist may include accessing metadata for multiple media items in a media library that is associated with the first user, and for each of the multiple media items, determining a mutual interest score based on the accessed metadata and the set of media preferences shared between the first user and the second user. The accessed metadata may indicate characteristics of content included in the multiple media items. For example, the mutual interest determiner 124 may access metadata from the media storage 108. The playlist generator 126 may select media items from the multiple media items that have a mutual interest score over a defined threshold and may include the selected media items on the generated playlist.

In some implementations, multiple playlists are generated. For example, the playlist generator 126 may generate a first playlist based on the set of shared media preferences and on a first media library that is associated with the mobile computing device 102a, where each media item included in the first playlist is included in the first media library. The playlist generator 126 may also generate a second playlist based on the set of shared media preferences and on a second media library that is associated with the mobile computing device 102b, where each media item included in the second playlist is included in the second media library.

The server system 104 then sends one or more playlists (210). For example, the playlist generator 126 may send the first playlist to the mobile computing device 102a such that the first user is able to select one or more of the media items on the playlist to be output by the mobile computing device 102a. As another example, if multiple playlists are generated, the playlist generator 126 may send the first playlist to the mobile computing device 102a such that the first user is able to select one or more of the media items on the first playlist to be output by the mobile computing device 102a and may send the second playlist to the mobile computing device 102b such that the second user is able to select one or more of the media items on the second playlist to be output by the mobile computing device 102b.

Figure 3:
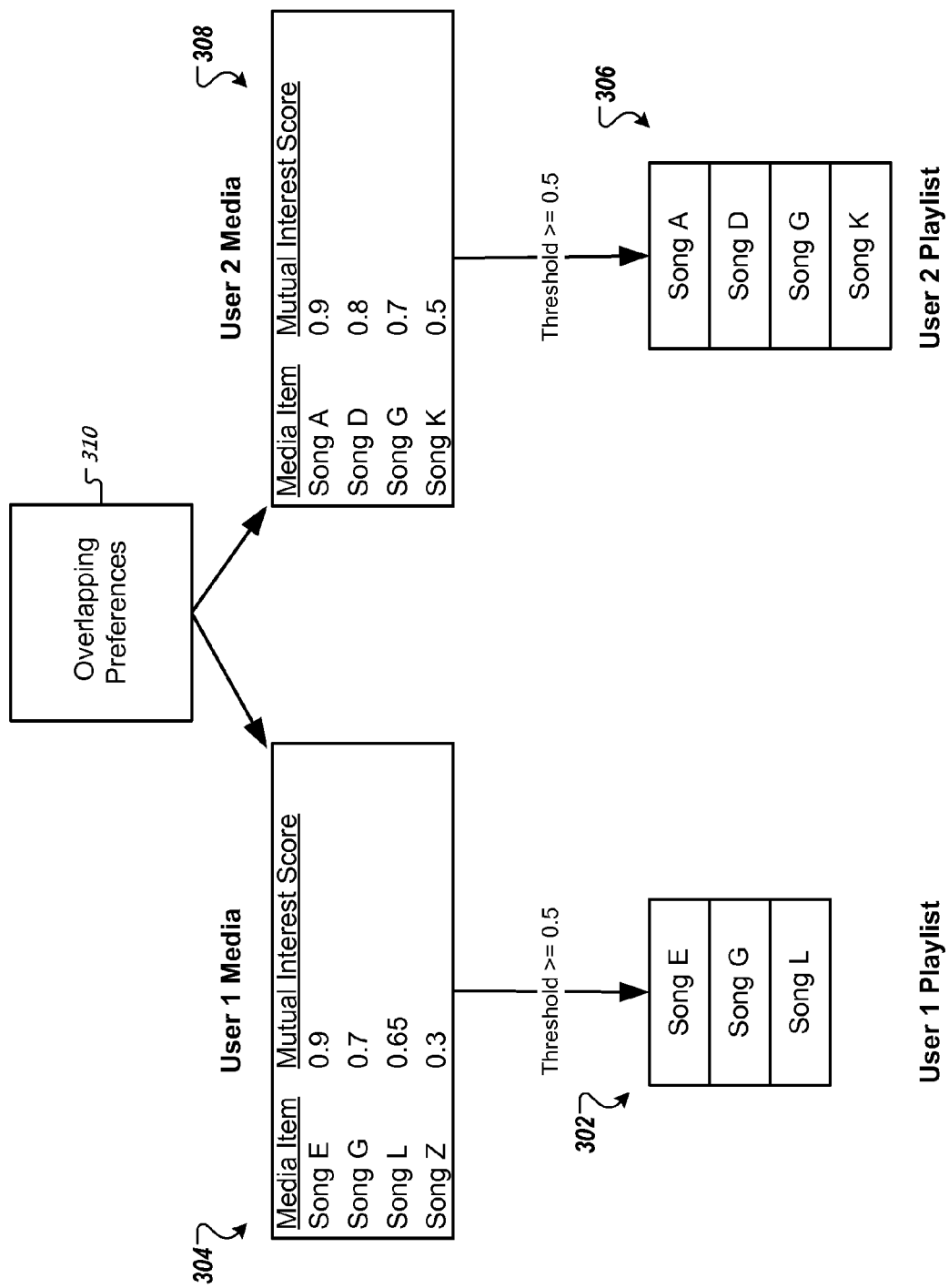
FIG. 3 illustrates an example of selecting media items for a playlist.

FIG. 3 illustrates an example of selecting media items for a playlist. A first playlist 302 is generated for a first user by selecting media items included in a first media library 304 associated with the first user. Similarly, a second playlist 306 is generated for a second user by selecting media items included in a second media library 308 associated with the second user.

The generation of the first playlist 302 and the second playlist 306 is based on overlapping preferences 310. The overlapping preferences 310 include an overlap of media preferences between the first user and the second user. For example, the overlapping preferences 310 indicate an overlap between a first set of personal media preferences for the first user and a second set of personal media preferences for the second user, where the first set of personal media preferences and the second set of personal media preferences may each be based, for example, on historical usage data associated with the first user and the second user, respectively. The first set and second set of personal media preferences may also be based, for example, on media items included in the media library 304 and the media library 308, respectively.

To generate the playlist 302, metadata is accessed for each media item included in the media library 304, where the metadata indicates characteristics of a respective media item. A mutual interest score is determined for each of the media items included in the media library 304 based on the accessed metadata and the overlapping preferences 310. For example, mutual interest scores of 0.9, 0.7, 0.65, and 0.3 have been generated for songs "E", "G", "L", and "Z", respectively. Media items that have a mutual interest score over a defined threshold may be selected for inclusion in the playlist 302. For example, songs "E", "G", and "L" have each been selected for inclusion in the playlist 302 based on each having a respective mutual interest score greater than or equal to a threshold of 0.5.

A similar process is used to generate the playlist 306. Mutual interest scores are determined for each media item included in the media library 308. For example, mutual interest scores of 0.9, 0.8, 0.7, and 0.5 have been determined for songs "A", "D", "G", and "K", respectively. Songs "A", "D", "G", and "K" have each been selected for inclusion in the playlist 306 based on each having a respective mutual interest score greater than or equal to a threshold of 0.5. The playlist 302 may be sent to a mobile computing device associated with the first user and the playlist 306 may be sent to a mobile computing device associated with the second user.

Figure 4:
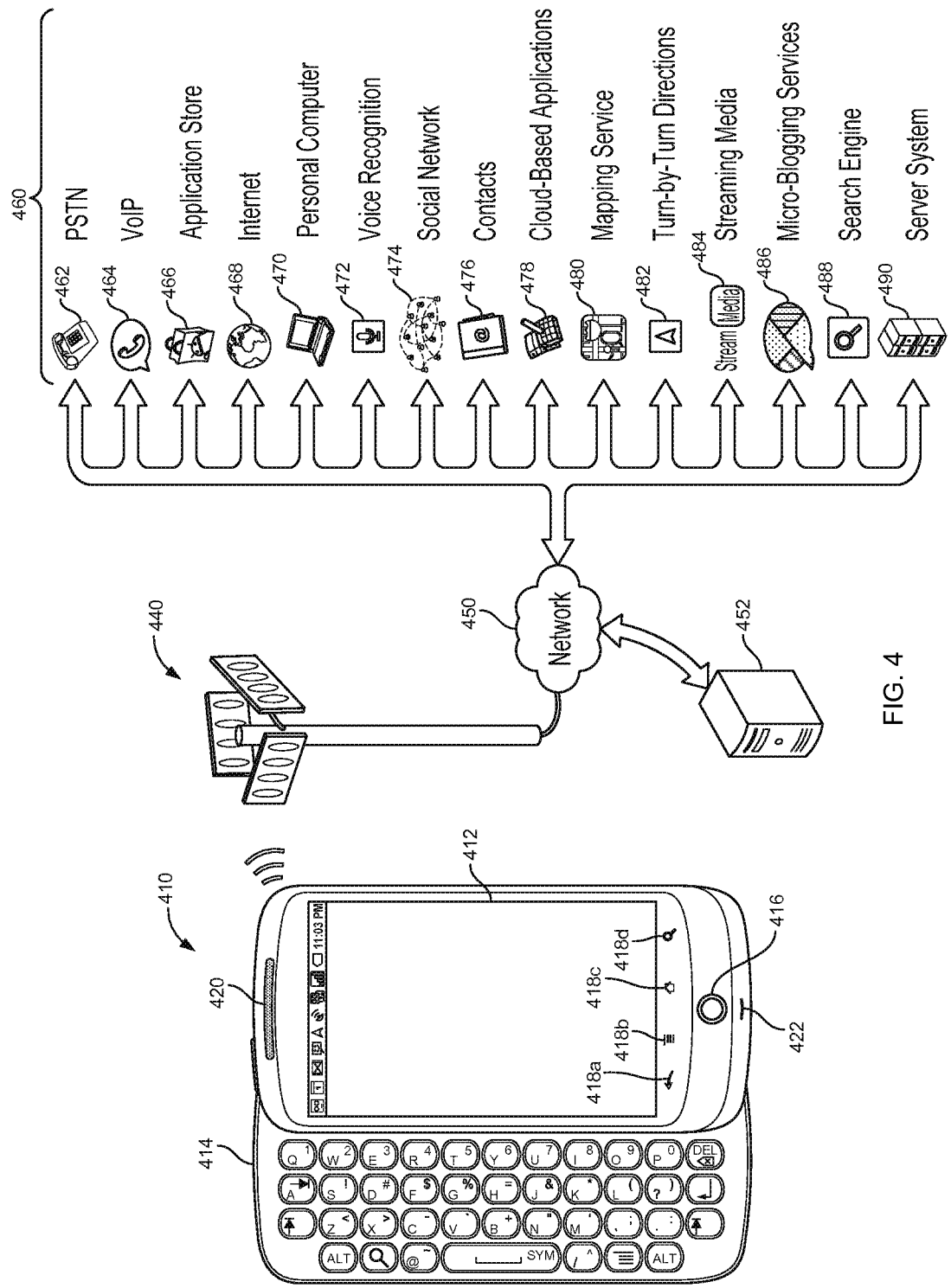
FIG. 4 is a diagram of a system that may be used to implement the systems and methods described in this document.

Referring now to FIG. 4, a conceptual diagram of a system that may be used to implement the systems and methods described in this document is illustrated. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-9', '*' and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEBOS operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 414. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographic position. A location-identification mechanism may employ satellite-based positioning techniques, base station transmitting antenna identification, multiple base station triangulation, internet access point IP location determinations, inferential identification of a user's position based on search engine queries, near field communication, Bluetooth communication, detection of signals by microphone, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographicly moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographic locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded song, a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 5:
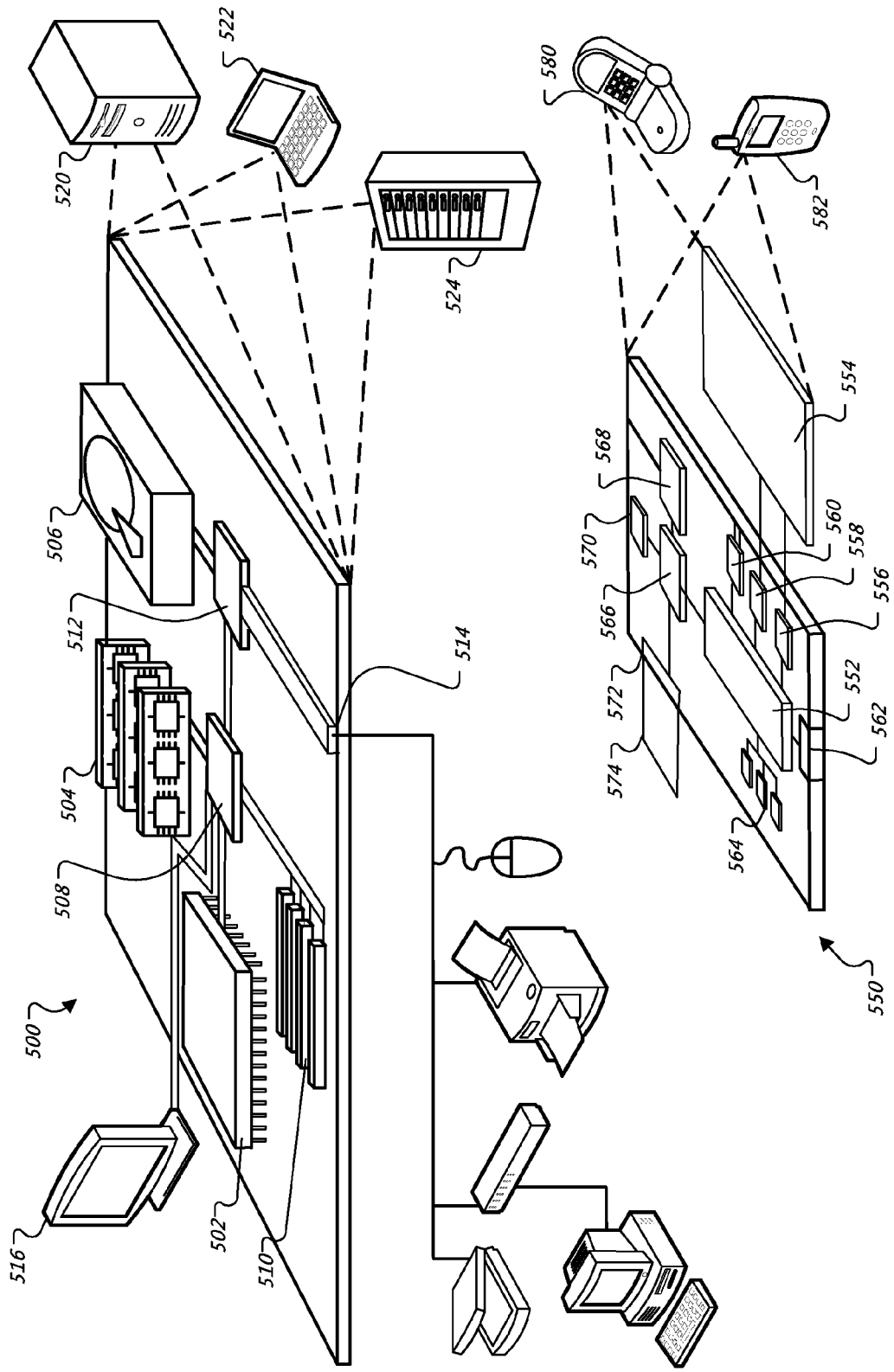
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
  receiving, by a media server, first data indicating a geographic location of a first device;

receiving, by a media server, second data indicating a geographic location of a second device;

determining, using the media server and based on the first data indicating the geographic location of the first device and the second data indicating the geographic location of the second device, that the first device is within a defined geographic proximity of the second device;

in response to determining that the first device is within the defined geographic proximity of the second device, generating an initial playlist of media items based on a set of media preferences shared between a user of the first device and a user of the second device;

generating, by the media server, (i) a first updated playlist of media items that includes a first subset of the media items in the initial playlist that are accessible to the first device and does not include media items in the initial playlist that are not accessible to the first device, and (ii) a second updated playlist of media items that includes a second subset of the media items in the initial playlist that are accessible to the second device and does not include media items in the initial playlist that are not accessible to the second device; and transmitting, by the media server, (i) the first updated playlist of media items to the first device, and (ii) the second updated playlist of media items to the second device.

2. The method of claim 1, wherein the first data indicating the geographic location of the first device include data provided by a global positioning system (GPS) unit of the first device.

3. The method of claim 1, wherein the first data indicating the geographic location of the first device include data manually provided by the user of the first device using an application on the first device.

4. The method of claim 1, wherein the first data indicating the geographic location of the first device includes an identification of a venue associated with the geographic location of the first device, and the second data indicating the geographic location of the second device includes a venue identification associated with the geographic location of the second device.

5. The method of claim 4, wherein determining that the first device is within a defined geographic proximity of the second device comprises determining that the venue identification associated with the geographic location of the first device and the venue identification associated with the geographic location of the second device match.

6. The method of claim 4, wherein determining that the first device is within a defined geographic proximity of the second device comprises:

providing, to the first device, multiple venue identifications associated with the geographic location of the first device, wherein the first data indicating the geographic location of the first device includes the venue identification associated with the geographic location of the first device selected among the multiple venue identifications by the user of the first device.

7. The method of claim 1, wherein determining that the first device is within a defined geographic proximity of the second device comprises determining that the first device is able to exchange data with the second device using near field communication.

8. The method of claim 1, wherein determining that the first device is within a defined geographic proximity of the second device comprises determining that an audio receiver of the first device has received audio input from the second device.

9. The method of claim 1, wherein the initial playlist of media items include media items from a media library of the user of the first device and a media library of the user of the second device, and wherein the media library of the user of the first device and the media library of the user of the second device are remotely hosted by a server system.

10. The method of claim 1, wherein generating an initial playlist of media items based on a set of media preferences shared between a user of the first device and a user of the second device comprises:

accessing a playlist of the user of the first device remotely hosted by a server system;

accessing a playlist of the user of the second device remotely hosted by the server system;

deriving a set of media preferences for the user of the first device;

deriving a set of media preferences for the user of the second device; and comparing the set of media preferences for the user of the first device and the set of media preferences for the user of the second device to derive the set of media preferences shared between the user of the first device and the user of the second device.

11. The method of claim 1, further comprising:

transmitting the first updated playlist to the first device for outputting media items on the first updated playlist, using the first device, to the user of the first device and the user of the second device.

12. A non-transitory computer-readable medium storing software having stored thereon instructions, which, when executed by one or more computers, cause the one or more computers to perform operations of:

receiving, by a media server, first data indicating a geographic location of a first device;

receiving, by a media server, second data indicating a geographic location of a second device;

determining, using the media server and based on the first data indicating the geographic location of the first device and the second data indicating the geographic location of the second device, that the first device is within a defined geographic proximity of the second device;

in response to determining that the first device is within the defined geographic proximity of the second device, generating an initial playlist of media items based on a set of media preferences shared between a user of the first device and a user of the second device;

generating, by the media server, (i) a first updated playlist of media items that includes a first subset of the media items in the initial playlist that are accessible to the first device and does not include media items in the initial playlist that are not accessible to the first device, and (ii) a second updated playlist of media items that includes a second subset of the media items in the initial playlist that are accessible to the second device and does not include media items in the initial playlist that are not accessible to the second device; and transmitting, by the media server, (i) the first updated playlist of media items to the first device, and (ii) the second updated playlist of media items to the second device.

13. The computer-readable medium of claim 12, wherein generating an initial playlist of media items based on a set of media preferences shared between a user of the first device and a user of the second device comprises:

accessing a playlist of the user of the first device remotely hosted by a server system;

accessing a playlist of the user of the second device remotely hosted by the server system;

deriving a set of media preferences for the user of the first device;

deriving a set of media preferences for the user of the second device; and comparing the set of media preferences for the user of the first device and the set of media preferences for the user of the second device to derive the set of media preferences shared between the user of the first device and the user of the second device.

14. The computer-readable medium of claim 12, wherein the operations further comprise:

transmitting the first updated playlist to the first device for outputting media items on the first updated playlist, using the first device, to the user of the first device and the user of the second device.

15. A system comprising:

one or more computers and one or more storage devices storing instructions that are operable, when executed by the one or computers, to cause the one or more computers to perform operations comprising:

receiving, by a media server, first data indicating a geographic location of a first device;

receiving, by a media server, second data indicating a geographic location of a second device;

determining, using the media server and based on the first data indicating the geographic location of the first device and the second data indicating the geographic location of the second device, that the first device is within a defined geographic proximity of the second device;

in response to determining that the first device is within the defined geographic proximity of the second device, generating an initial playlist of media items based on a set of media preferences shared between a user of the first device and a user of the second device;

generating, by the media server, (i) a first updated playlist of media items that includes a first subset of the media items in the initial playlist that are accessible to the first device and does not include media items in the initial playlist that are not accessible to the first device, and (ii) a second updated playlist of media items that includes a second subset of the media items in the initial playlist that are accessible to the second device and does not include media items in the initial playlist that are not accessible to the second device; and transmitting, by the media server, (i) the first updated playlist of media items to the first device, and (ii) the second updated playlist of media items to the second device.

16. The system of claim 15, wherein generating an initial playlist of media items based on a set of media preferences shared between a user of the first device and a user of the second device comprises:

accessing a playlist of the user of the first device remotely hosted by a server system;

accessing a playlist of the user of the second device remotely hosted by the server system;

deriving a set of media preferences for the user of the first device;

deriving a set of media preferences for the user of the second device; and comparing the set of media preferences for the user of the first device and the set of media preferences for the user of the second device to derive the set of media preferences shared between the user of the first device and the user of the second device.

17. The system of claim 15, wherein the operations further comprise:

transmitting the first updated playlist to the first device for outputting media items on the first updated playlist, using the first device, to the user of the first device and the user of the second device.

\* \* \* \* \*